June 2, 1931.　　　E. P. DU PONT　　　1,808,298

AUTOMOBILE TOP

Filed Dec. 4, 1928　　　2 Sheets-Sheet 1

WITNESS:

INVENTOR
Eleuthere Paul du Pont
BY
ATTORNEYS

June 2, 1931.  E. P. DU PONT  1,808,298
AUTOMOBILE TOP
Filed Dec. 4, 1928  2 Sheets-Sheet 2

WITNESS:

INVENTOR
Eleuthere Paul du Pont
BY
ATTORNEYS.

UNITED STATES PATENT OFFICE

ELEUTHERE PAUL du PONT, OF MONTCHANIN, DELAWARE

AUTOMOBILE TOP

Application filed December 4, 1928. Serial No. 323,654.

This invention relates to a folding top for automobiles and is particularly adapted to the construction of a top for a sport model roadster.

It is desirable, for hot weather or the like, to provide a top for an automobile which may be substantially entirely removed but which may be readily put up in case of storm or used during cold weather. Folding tops heretofore constructed when folded have generally given a bulky appearance to the rear of the seat of an automobile, whereas it is desirable to eliminate the relatively unsightly folded top to as great an extent as possible.

The object of the present invention is accordingly to provide a foldable top which, when in folded position, will be substantially invisible, those parts which do show appearing as portions of the body of the automobile. A further object is to provide a top of this character which may be very readily assembled or taken down.

Figure 1:
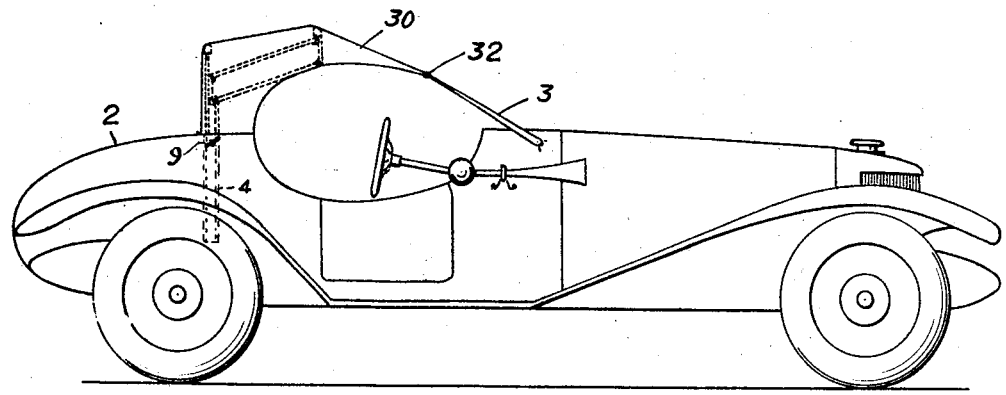
Fig. 1 is a side elevation of an automobile showing the top in its raised position.
Figures 2, 3:
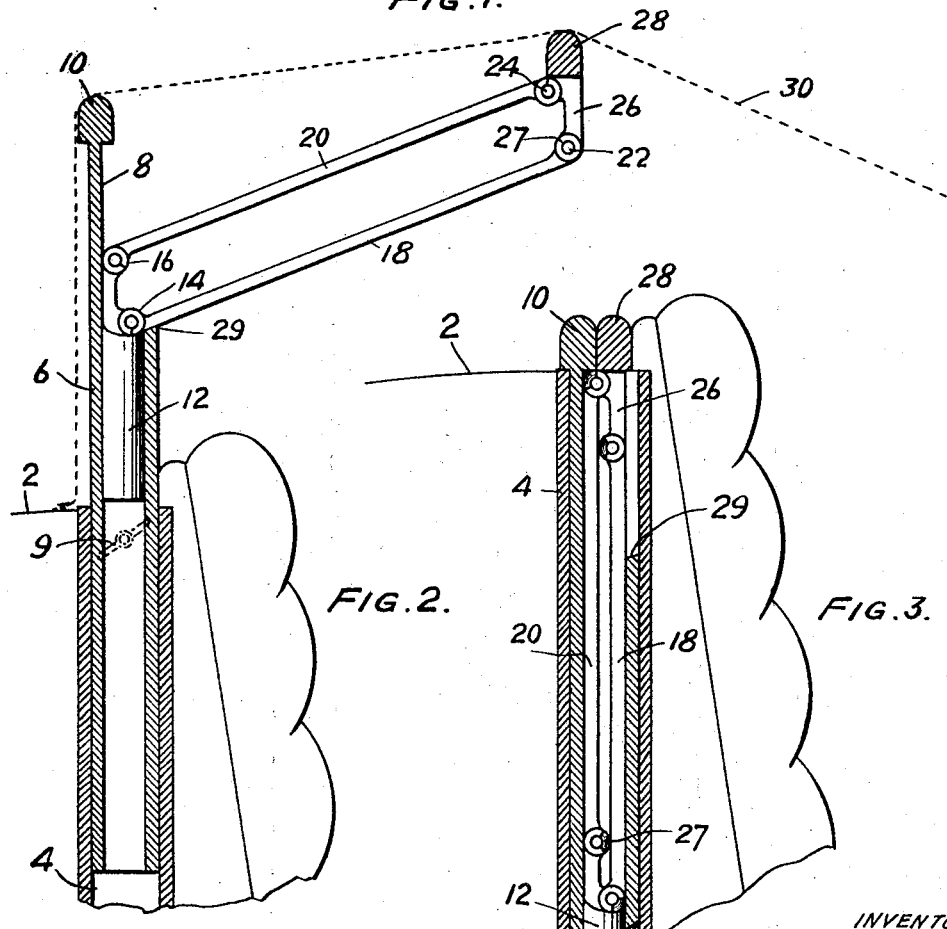
Fig. 2 is a vertical section showing details of construction of the top frame, the parts being in expanded position.
Fig. 3 is a view similar to Fig. 2, showing the parts in collapsed position.
Figure 4:
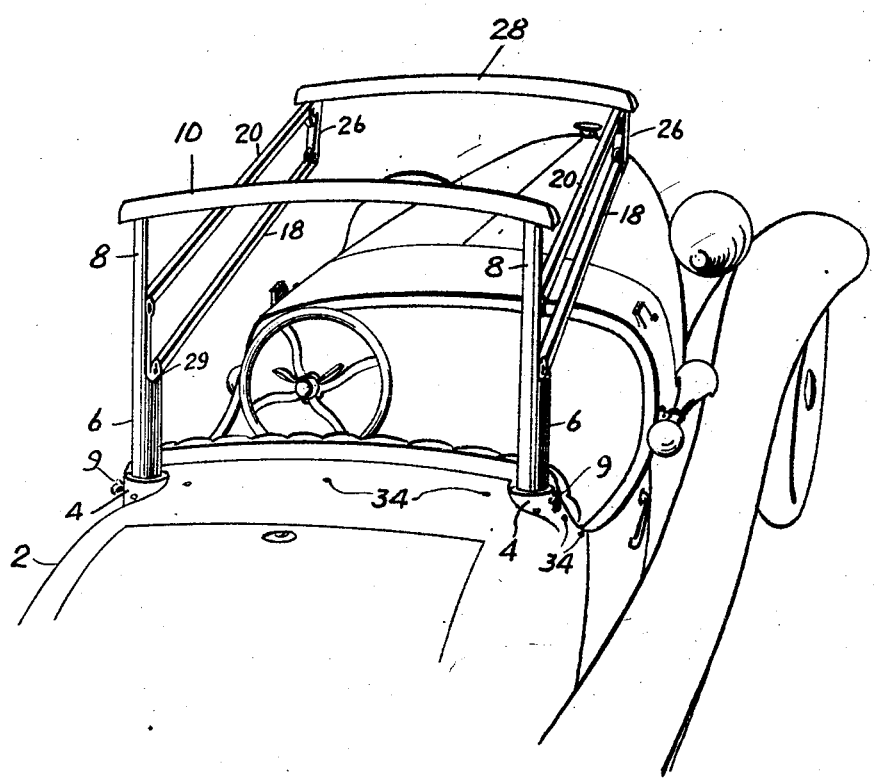
Fig. 4 is a perspective view of a portion of the automobile showing the top frame with the cover removed.

At 2 is indicated the body of a sport model roadster having a rearwardly sloping wind shield 3. Formed in the body 2 directly behind the front seat, as shown in Figs. 2 and 3, are tubular guideways 4. In each of these guideways is mounted a tubular upright frame member 6, the upper portion of which projects as an upright post 8 forming a continuation of the rear of tube 6. Secured to the upper ends of posts 8 is a cross member or bow 10 curved as shown in Fig. 4.

Within each tubular upright member 6 is slidably mounted a plunger 12 to the top of which is secured at pivots 14 and 16 links 18 and 20 which are respectively secured at pivots 22 and 24 to side members 26 which support a front cross member or bow 28. Pivots 14, 16, 22 and 24 are arranged to form a rectangular linkage so that links 18 and 20 extend forwardly and upwardly in parallelism and also extend in parallelism when the frame is collapsed. The various pivots are provided with engaging stop faces 27 which prevent clockwise movement of links 18 and 20 from the extreme position shown in Fig. 2. When the linkage described is extended, as shown in Fig. 2, link 18 engages the top cutaway portion of tube 6 at 29. Thus the frame is maintained in position against downward stresses imparted to cross bow 28 by the cover 30 which is secured over the top of bows 10 and 28 and to the wind shield and body of the car behind the front sides by means of snap buttons or the like 32 and 34.

When in expanded position, as shown in Fig. 2, tubular members 6 are supported in projected positions from guideways 4 by means of wing-nuts 9 which extend through the guideways and bind against the tubes. Plungers 12 are in the position shown in Fig. 2 and link 18 rests at 29 on the upper edge of tube 6. The cover is then stretched over the two bows.

If it is desired to collapse the top, the cover is removed, folded and stowed away in some convenient portion of the car. Links 18 and 20 are rotated about pivots 14 and 16 bringing them into substantially longitudinal alignment with plungers 12 and plungers 12 and the links may then be dropped down into tubular upright members 6. By releasing wing-nuts 9, tubular member 6 may be dropped into guideways 4. In this way the parts are brought to the positions illustrated in Fig. 3. Bows 10 and 28 are preferably curved to conform to the upper surface of the body behind the front seat so that when the parts are in the collapsed position shown in Fig. 3, these bows appear as moulding and parts of the body, being substantially hidden behind the upwardly projecting back of the seat.

What I claim and desire to protect by Letters Patent is:

1. In an automobile, a plurality of tubular guideways, tubular upright frame members slidably mounted in said guideways, a cross member connecting the tops of said upright frame members, a plunger mounted in each of said upright frame members, a plurality of links pivoted to each of the plungers, and a second cross member pivoted to the links, whereby the plungers and links may be collapsed and received within the tubular upright frame members, and the tubular upright frame members may be received within the tubular guideways.

2. In an automobile, a plurality of tubular guideways, tubular upright frame members slidably mounted in said guideways, a cross member connecting the tops of said upright frame members, a plunger mounted in each of said upright frame members, a plurality of links pivoted to each of the plungers, a second cross member pivoted to the links, whereby the plungers and links may be collapsed and received within the tubular upright frame members, and the tubular upright frame members may be received within the tubular guideways, means for holding the tubular upright members projected from the guideways, means for holding the other frame members in expanded position, and a cover for the frame.

3. In an automobile, a plurality of tubular guideways, tubular upright frame members slidably mounted in said guideways, a cross member connecting the tops of said upright frame members, a plunger mounted in each of said upright frame members, a plurality of links pivoted to each of the plungers, a second cross member pivoted to the links, whereby the plungers and links may be collapsed and received within the tubular upright frame members, and the tubular upright frame members may be received within the tubular guideways, means for holding the tubular upright members projected from the guideways, means for limiting pivotal movement of the links relative to the plungers whereby they rest in expanded position on the tubular members, and a cover for the frame.

4. In an automobile, a plurality of tubular guideways, tubular upright frame members slidably mounted in said guideways, a cross member connecting the tops of said upright frame members, a plunger mounted in each of said upright frame members, and a collapsible frame pivoted to the plunger and adapted to extend horizontally, said frame being at least partially receivable within the tubular upright frame members.

In testimony of which invention, I have hereunto set my hand, at Wilmington, Delaware, on this thirtieth day of November, 1928.

ELEUTHERE PAUL DU PONT.